(12) United States Patent
Tanaka et al.

(10) Patent No.: US 6,993,711 B1
(45) Date of Patent: Jan. 31, 2006

(54) STYLE-SHEET OUTPUT APPARATUS AND METHOD, AND STYLE-SHEET OUTPUT SYSTEM

(75) Inventors: Keisuke Tanaka, Asaka (JP); Norihisa Haneda, Asaka (JP); Hiroshi Suganuma, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 914 days.

(21) Appl. No.: 09/630,136

(22) Filed: Aug. 1, 2000

(30) Foreign Application Priority Data

Aug. 2, 1999 (JP) .......................................... 11-218539

(51) Int. Cl.
*G06F 17/00* (2006.01)

(52) U.S. Cl. .................... 715/513; 715/517; 707/102
(58) Field of Classification Search ................. 715/513, 715/526, 517; 707/102
See application file for complete search history.

(56) References Cited

U.S. PATENT DOCUMENTS

| 6,023,714 A | * | 2/2000 | Hill et al. ................... 715/513 |
| 6,463,440 B1 | * | 10/2002 | Hind et al. ................. 707/102 |
| 6,507,857 B1 | * | 1/2003 | Yalcinalp ................... 715/513 |
| 6,589,291 B1 | * | 7/2003 | Boag et al. ................. 715/513 |

* cited by examiner

*Primary Examiner*—Sanjiv Shah
(74) *Attorney, Agent, or Firm*—McGinn IP Law Group, PLLC

(57) ABSTRACT

Style sheets indicating layouts of a plurality of types are stored in a server. The user of a client computer selects the style sheet having the desired layout. When the user of the client computer subsequently accesses the server for the purpose of conducting a search, the results of the search are displayed on the selected style sheet. The user need not select the desired style sheet whenever the server is accessed.

5 Claims, 7 Drawing Sheets

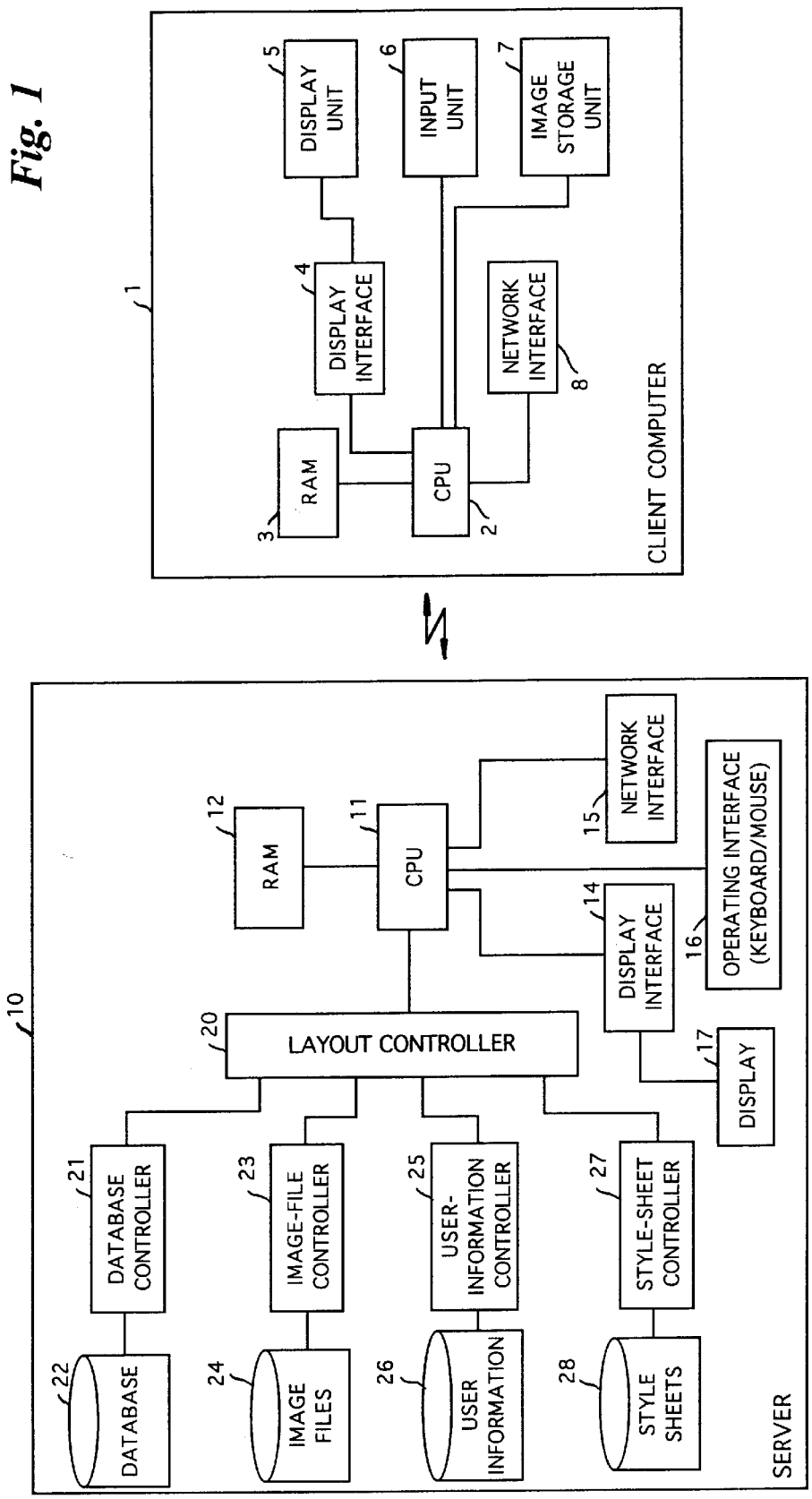

*Fig. 2*

USER INFORMATION TABLE

| USER ID | USER NAME | PASSWORD | FULL NAME OF USER | USER DESCRIPTION | SYSTEM PRIVILEGE | REGISTRATION PRIVILEGE | . | . | . | STYLE SHEET |
|---|---|---|---|---|---|---|---|---|---|---|
| 0 | Administrator | ********** | ADMINISTRATOR | SYSTEM ADMINISTRATOR | ENABLED | ENABLED | . | . | . | TYPE A |
| 1 | taro | ********** | JOHN DOE | ASSISTANT SYSTEM ADMINISTRATOR | ENABLED | ENABLED | . | . | . | TYPE D |
| 2 | fuji | ********** | MARY SMITH | GENERAL USER | DISABLED | ENABLED | . | . | . | TYPE A |
| 3 | hanako | ********** | JOE BROWN | GENERAL USER | DISABLED | DISABLED | . | . | . | TYPE B |
| . | . | . | . | . | . | . | . | . | . | . |
| . | . | . | . | . | . | . | . | . | . | . |
| . | . | . | . | . | . | . | . | . | . | . |

*Fig. 4*

SELECT STYLE SHEET

61 — Style Sheet Type A layout: TITLE, COMPANY NAME; three IMAGE blocks each with DATE, SITE, SITE NAME, REMARKS; COMMENTS, PAGE NO.; BACK/NEXT
62 — ● STYLE SHEET TYPE A 63 — Style Sheet Type B layout: TITLE, PAGE NO.; 3×3 grid of IMAGE with DATE, SITE, SITE NAME; BACK/NEXT
64 — ○ STYLE SHEET TYPE B 65 — Style Sheet Type C layout: TITLE, PAGE NO.; 3×3 grid of IMAGE with SITE; BACK/NEXT
66 — ○ STYLE SHEET TYPE C 67 — Style Sheet Type D layout: TITLE, PAGE NO.; 5×3 grid of IMAGE; BACK/NEXT
68 — ○ STYLE SHEET TYPE D

71 — CONFIRM    72 — CANCEL

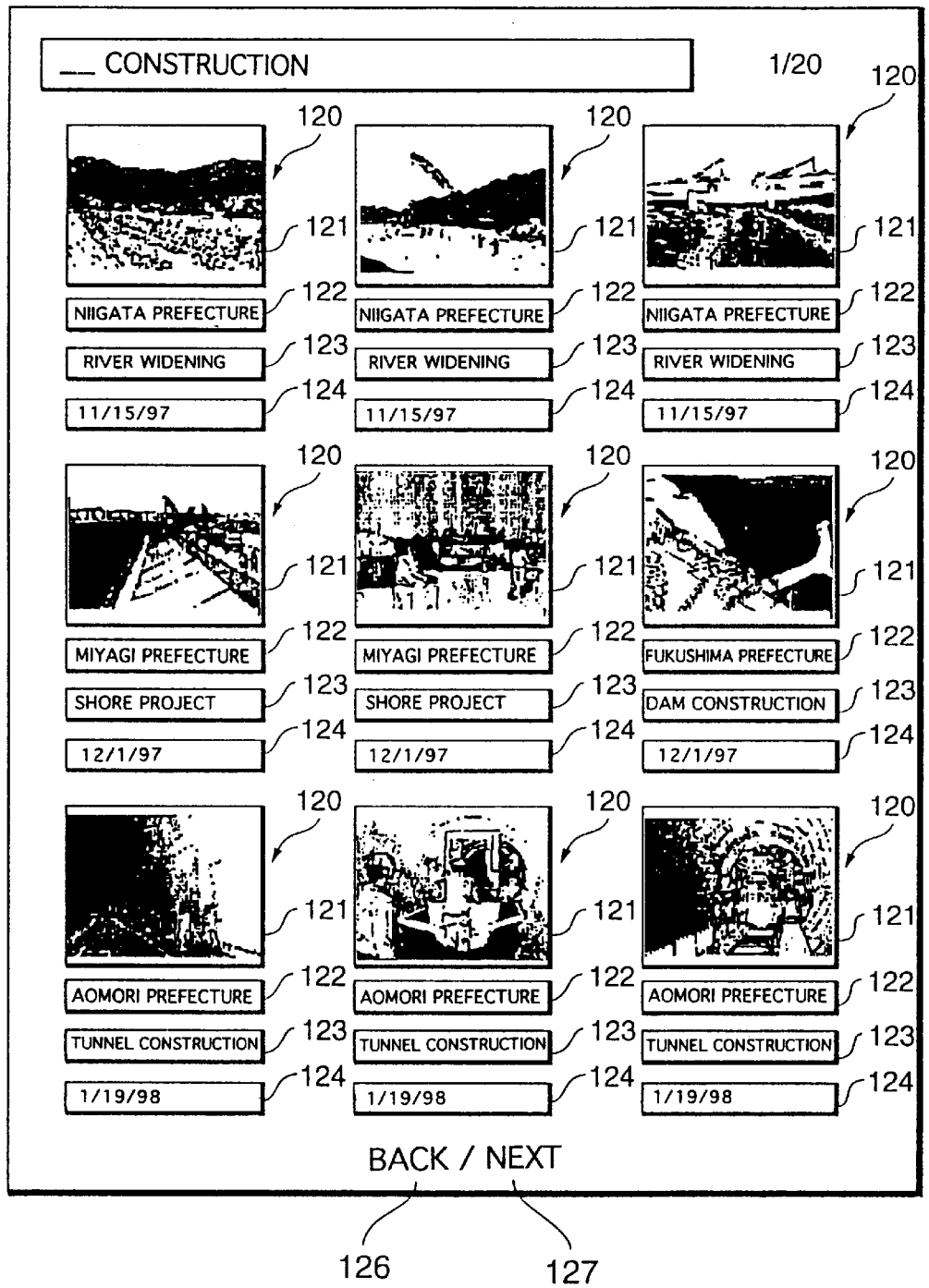

STYLE-SHEET OUTPUT APPARATUS AND METHOD, AND STYLE-SHEET OUTPUT SYSTEM

BACKGROUND OF THE INVENTION

1. Field of the Invention

This invention relates to an apparatus, method and system for outputting data representing a style sheet which stipulates the layout of images inclusive of a plurality of items such as images and text.

2. Description of the Related Art

In general, images obtained by searching an image database or the like are displayed on a display unit in accordance with a predetermined layout. However, since the users of image databases are involved in a variety of businesses, there are instances where displaying the results of a search in a fixed layout at all times will provide a display in a layout that is not in accordance with user preference.

DISCLOSURE OF THE INVENTION

For this reason, consideration has been given to providing a variety of layouts and allowing the user to select the layout that is desired.

However, since the user must select the desired layout whenever the image database is utilized, the user is compelled to perform a very troublesome operation. In particular, the larger the number of layouts available, the more troublesome the selection of the layout becomes.

Accordingly, an object of the present invention is to reduce the amount of labor required of a user when selecting a layout.

According to a first aspect of the present invention, the foregoing object is attained by providing a style-sheet output apparatus comprising: a style-sheet designating unit (style-sheet designating means) for designating a desired style sheet from among a plurality of style sheets, wherein there have been stored a plurality of types of data representing style sheets stipulating layouts of images which include a plurality of items such as images and text; a storage unit for storing, in association with a user, data identifying a style sheet designated by the style-sheet designating unit; an identification-data input unit for inputting data which identifies a user; a read-out command input unit (a unit for giving a trigger to read out a style sheet is included) for inputting a style-sheet read-out command; and a style-sheet output unit for outputting, in accordance with a style-sheet read-out command that has been input from the read-out command input unit, and on the basis of a relationship that has been stored in the storage unit, data representing a style sheet corresponding to a user identified by identification data that has been input from the identification-data input unit.

The first aspect of the present invention provides also a method suited to the apparatus described above. Specifically, according to the first aspect of the present invention, there is provided a style-sheet output method comprising the steps of: designating a desired style sheet from among a plurality of style sheets, wherein a plurality of types of data representing style sheets stipulating layouts of images which include a plurality of items such as images and text have been stored; storing, in association with a user, data identifying a style sheet that has been designated; inputting data which identifies a user as well as a style-sheet read-out command; and outputting data, which represents a style sheet corresponding to a user identified by identification data, in accordance with a style-sheet read-out command.

In accordance with the first aspect of the present invention, a plurality of types of data representing style sheets stipulating layouts of images which include a plurality of items such as images and text are stored. A user designates the desired style sheet from among the plurality of style sheets. When the style sheet is designated, the relationship between the data identifying the designated style sheet and the user who designated this style sheet is stored.

Data identifying a user and a style-sheet read-out command are thenceforth entered. When this is done, data representing the style sheet corresponding to this user is outputted. The data representing the style sheet is applied to a display unit, for example, whereby the style sheet having the layout desired by the user is displayed.

Thus, once a user designates a style sheet, it is unnecessary for the user to designate the style sheet subsequently. Data representing the style sheet that was designated by the user will be output subsequently as well and the desired style sheet will be displayed on a display unit or the like.

A relationship between data identifying a prescribed style sheet and a user may be stored. When a designation is made by the user in such case, the stored data identifying the prescribed style sheet is rewritten to data identifying the designated style sheet. The prescribed style sheet may be different for each user or may be the same for all users.

In a case where the style-sheet output apparatus is applied to a retrieval system, the apparatus would be further provided with a search-condition input unit (search-condition input means) for inputting a search condition; a search unit (search means) for searching an image database for data representing an image based upon a search condition that has been input from the search-condition input unit; and a unit (means) for merging an image represented by image data found by the search conducted by the search unit with a style sheet represented by data that has been output from the style-sheet output unit.

Thus, an image retrieved through a search is merged with a layout stipulated by a desired style sheet.

A second aspect of the present invention is a style-sheet output system comprising a server and a client computer that are capable of communicating data with each other.

A plurality of types of data representing style sheets stipulating layouts of images which include a plurality of items such as images and text are stored in the system. The client computer in this system designates a desired style sheet from among a plurality of style sheets and transmits data identifying the designated style sheet to the server. The server stores the data identifying the designated style sheet in association with the user.

The client computer is provided with an identification-data input unit for inputting user identification data which identifies a user; a read-out command input unit for inputting a style-sheet read-out command; and a transmitting unit for transmitting, to the server, user identification data that has been input by the identification-data input unit and a read-out command that has been input by the read-out command input unit.

The server is provided with a receiving unit for receiving the user identification data and the read-out command that have been transmitted from the transmitting unit of the client computer, and with a style-sheet output unit for outputting, in accordance with a style-sheet read-out command that has been received by the receiving unit, data representing a style sheet corresponding to a user identified by the user identification data.

Thus, a style sheet having a layout desired by a user is obtained even in a system in which a server and a client computer are capable of communicating data with each other.

Furthermore, once a user designates a style sheet, it is unnecessary for the user to designate the style sheet subsequently. Data representing the style sheet that was designated by the user will be output subsequently as well and the desired style sheet will be displayed on a display unit or the like.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the electrical construction of a database search system;

FIG. 2 is a table illustrating user information;

FIG. 4 shows an example of a style-sheet selection image;

FIGS. 6 and 7 illustrate examples of style sheets.

DESCRIPTION OF THE PREFERRED EMBODIMENT

Figure 3:
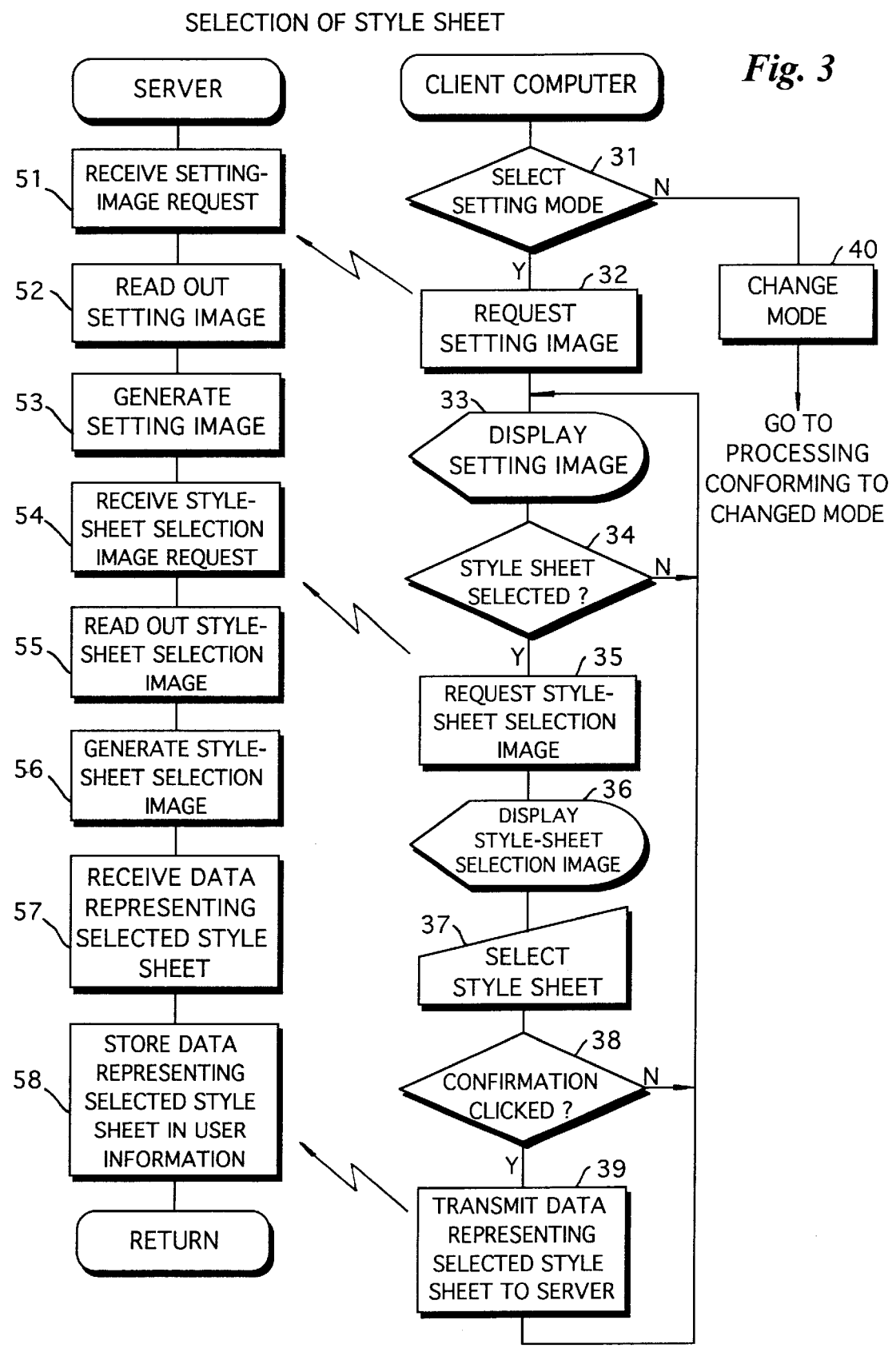
FIG. 3 is a flowchart illustrating style-sheet selection processing.

A preferred embodiment of the present invention will now be described with reference to the drawings.

FIG. 1 is a block diagram illustrating the electrical construction of an image database search system.

The image database search system according to this embodiment comprises a client computer 1 and a server 10 capable of communicating data with each other (via a network, for example).

Search conditions are entered in the client computer 1 and data indicating the entered search conditions is transmitted from the client computer 1 to the server 10. The server 10 conducts a search of image data and transmits image data found by the search to the client computer 1. The image data transmitted from the server 10 is received by the client computer 1, which has a display unit on which the images representing the search results are displayed.

The image database system according to this embodiment is such that a user is capable of previously selecting the layout of the images that represent the search results. The images that have been found by the search are displayed in the selected layout. The details will be described later.

The overall operation of the client computer 1 is controlled by a CPU 2.

The client computer 1 includes a RAM 3 for storing data temporarily and a network interface 8 for the purpose of communication. The client computer 1 further includes an image storage unit 7 for storing image data and other data, and an input unit (mouse, keyboard, etc.) 6 operated by the user of the client computer 1. Image data that has been stored in the image storage unit 7 is applied to a display unit 5 via a display interface 4, whereby an image is displayed.

The overall operation of the server 10 is controlled by a CPU 11.

The server 10 also includes a RAM 12 for storing data temporarily, a network interface 15 for the purpose of communication and an operating interface (keyboard, mouse) 16. Image data and other data is applied to a display unit 17 via a display interface 14, whereby an image and other data are displayed on the display screen of the display unit 17.

The server 10 includes a layout controller 20 by which images found by a search are displayed in the desired format in the manner described above.

The server 10 further includes a database 22 and a database controller 21 for controlling a database search of the database 22; an image file unit 24 for storing image data (image files); and an image-file controller 23 for storing image data in the image file unit 24 and for reading out image data that has been stored in the image file unit 24.

The server 10 further includes a user-information storage unit 26 storing information concerning users capable of accessing the server 10; a user-information controller 25 for reading out user information that has been stored in the user-information storage unit 26 and for storing user information in the user-information storage unit 26; a style-sheet storage unit 28 which stores style sheets for stipulating layouts; and a style-sheet controller 27 for reading out style sheets that have been stored in the style-sheet storage unit 28 and for storing style sheets in the style-sheet storage unit 28.

Through the server 10 in FIG. 1 is shown to include the database 22, image file unit 24, user-information storage unit 26 and style-sheet storage unit 28, these may be provided externally.

FIG. 2 illustrates an example of user information that has been stored in the user-information storage unit 26.

The following user information is stored in the user-information storage unit 26 for every user capable of accessing the server 10:

User ID:

This is data for identifying the user.

User name:

This is the name which the user employs on the network.

Password:

This is for verifying whether the user has the privilege to access the server 10.

Full name of user:

Here the real name of the user is indicated in full.

User description:

This indicates whether the user is an administrator, an assistant administrator or a general user.

System privilege:

This indicates whether the user has the right to rewrite user information (here information other than the style sheet).

Registration privilege:

This indicates whether user has the right to rewrite data that has been stored in the image file unit 24 and data that has been stored in the database 22.

Style sheet:

This identifies the style sheet which the user has selected in a manner described later. When a style sheet has not been selected by the user, data representing a prescribed style sheet is stored here.

FIG. 3 is a flowchart illustrating processing for selecting a style sheet.

The flowchart of FIG. 3 presupposes that the system 10 has been accessed by a user having the right to do so based upon the user ID and password.

An image for selecting a setting mode is being displayed on the display unit 5 of the client computer 1. There are a variety of setting modes, one of which is a style-sheet selection mode.

When a setting mode is selected by the user of the client computer 1 ("YES" at step 31), a setting-image request is generated (step 32) and data indicative of this mode is transmitted from the client computer 1 to the server 10. If a setting mode has not been selected ("NO" at step 31), the mode is changed.

When data indicative of the setting-image request is received by the server 10 (step 51), the server reads the image data representing the images used in the setting image out of the image file unit 24 and applies the image data to the layout controller 20. Further, the server reads a style sheet indicating the setting image out of the style-sheet storage unit 28 and applies the style sheet to the layout controller 20. The style-sheet storage unit 28 merges the images with the style sheet and generates data representing the setting image (step 53). The data representing the generated setting image is transmitted from the server 10 to the client computer 1.

The client computer 1 receives the image data representing the setting image transmitted from the server 10 and applies this image data to the display unit 5 so that the setting image is displayed on the display screen of the display unit 5 (step 33).

Various settings can be chosen on the setting image. If selection of a style sheet is chosen ("YES" at step 34), a request for a style-sheet selection image is generated (step 35). The generated request for the style-sheet selection image is transmitted from the client computer 1 to the server 10.

When the request for the style-sheet selection image transmitted from the client computer 1 is received by the server 10 (step 54), the server 10 reads the image data for generating the style-sheet selection image out of the image file unit 24 (step 55) and applies this image data to the layout controller 20. Further, the server 10 reads the style sheet for generating the style-sheet selection image out of the style-sheet storage unit 28. The style sheet that has been read out is applied to the layout controller 20. The latter generates data representing the style-sheet selection image (step 56). Data representing the generated style-sheet selection image is transmitted from the server 10 to the client computer 1.

When the data representing the style-sheet selection image is received by the client computer 1, this data is applied to the display unit 5 so that the style-sheet selection image is displayed on the display screen of the display unit 5 (step 36).

FIG. 4 shows an example of a style-sheet selection image.

In this embodiment, there are four types of style sheets. Of course, a greater number or a smaller number of style sheets may be stipulated.

A style sheet of type A is represented in an area 61. An area 62 is one checked by the user of the client computer 1 when the style sheet of type A is to be selected.

A style sheet of type B is represented in an area 63. An area 64 is one checked by the user of the client computer 1 when the style sheet of type B is to be selected.

A style sheet of type C is represented in an area 65. An area 66 is one checked by the user of the client computer 1 when the style sheet of type C is to be selected.

A style sheet of type D is represented in an area 67. An area 68 is one checked by the user of the client computer 1 when the style sheet of type D is to be selected.

The style-sheet selection image further includes a confirmation area 71 clicked by the user when a checked style sheet is finalized, and a cancel area 72 clicked by the user when the checked style sheet is canceled.

A desired style sheet is selected by checking any one of the areas 62, 64, 66 and 68 (step 37). If the confirmation area 71 is then clicked by the user ("YES" at step 38), data for identifying the style sheet that has been selected by the user is transmitted from the client computer 1 to the server 10 (step 39).

When the data representing the selected style sheet transmitted from the client computer 1 is received by the server 10 (step 57), data for identifying the selected style sheet is stored in user information in association with the user (step 58).

The result of a search obtained by searching the image database is subsequently displayed in the layout of the selected style sheet. Thus, the result of an image search can be displayed in a layout desired by the user. Moreover, since the style sheet selected by the user is registered as user information, it is unnecessary for the user to select the style sheet again the next time the system is accessed.

Figure 5:
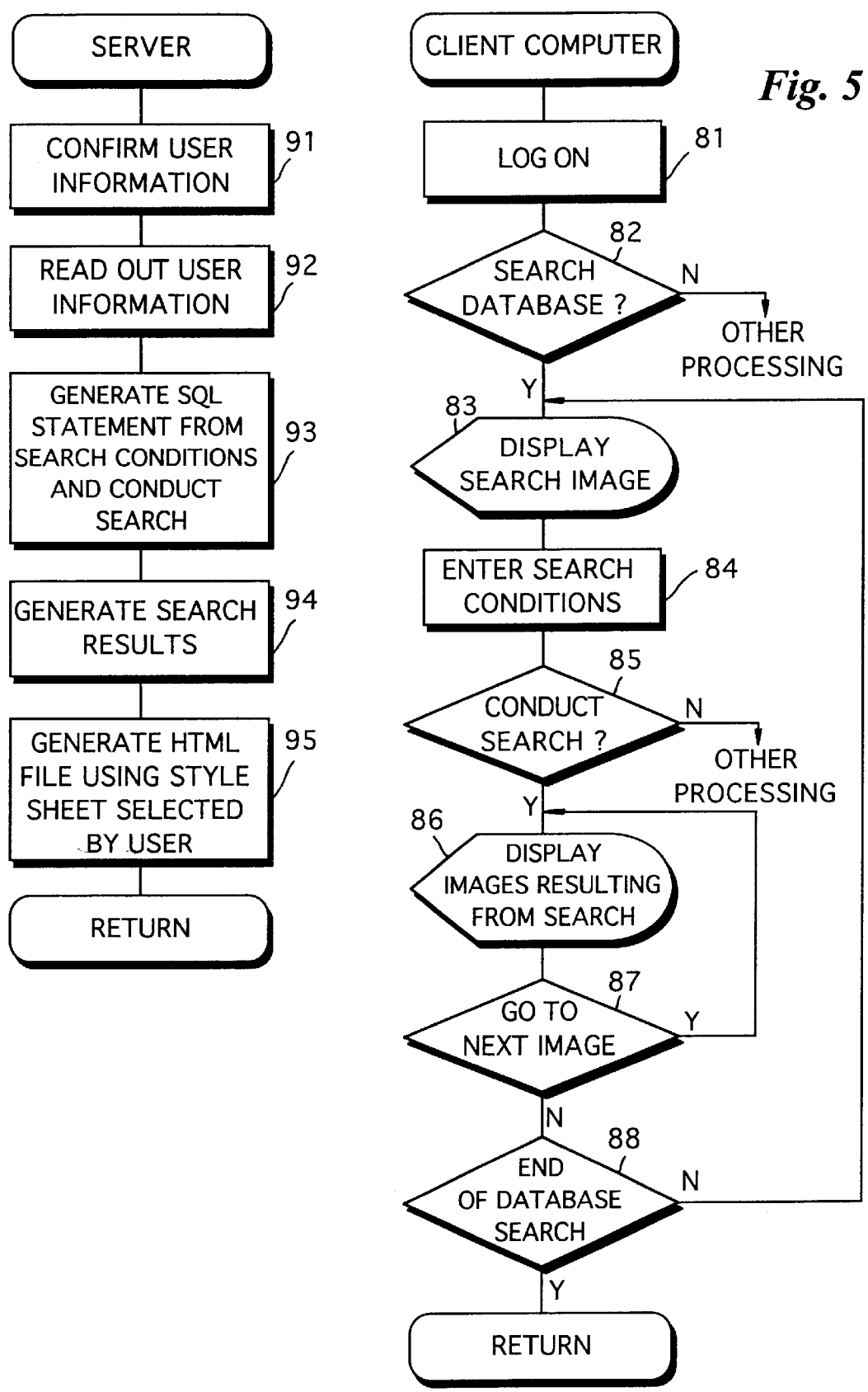
FIG. 5 is a flowchart illustrating database search processing.
Figure 6:
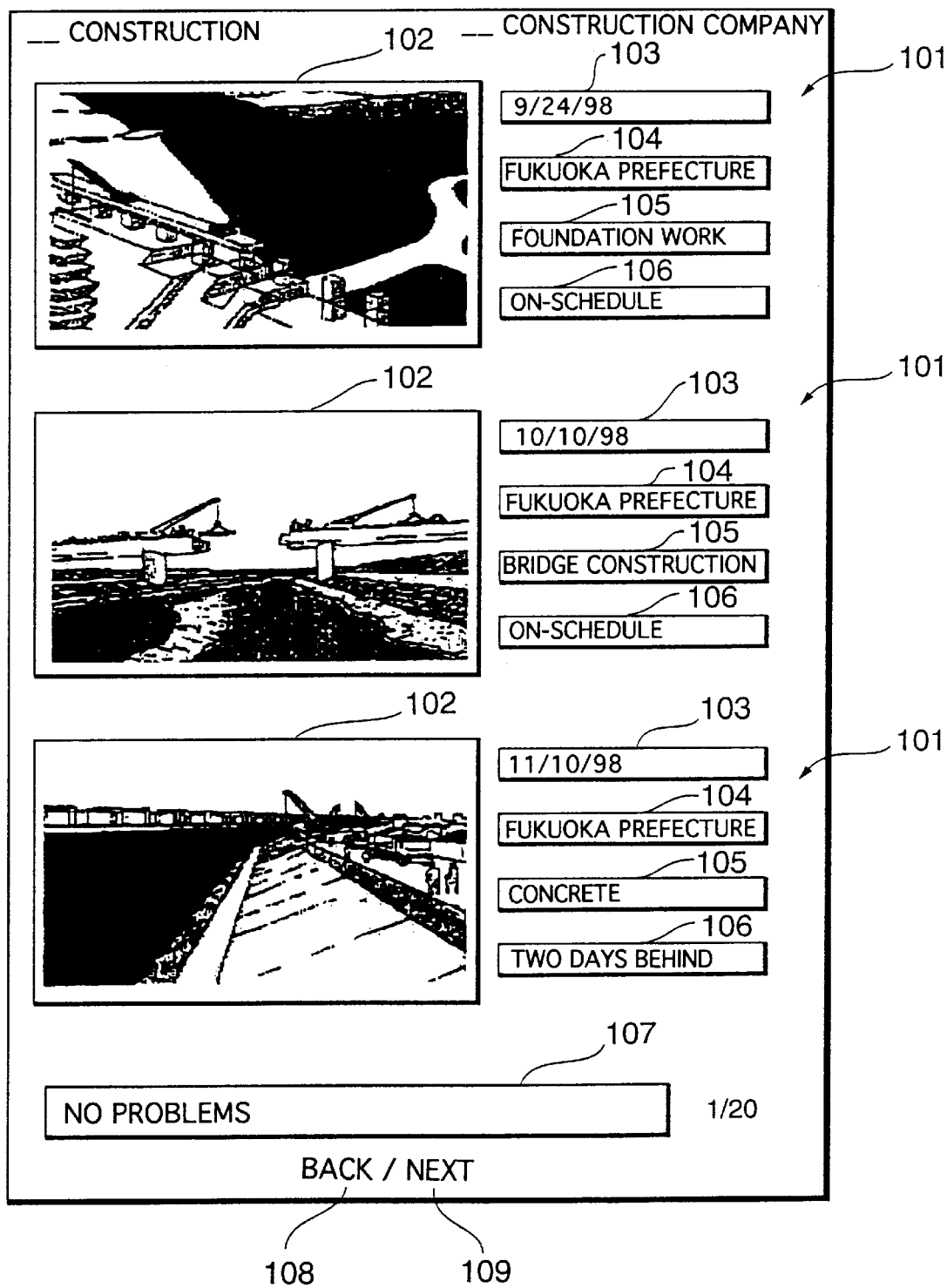

FIG. 5 is a flowchart illustrating image database search processing, and FIGS. 6 and 7 illustrate examples in which images are displayed on the display screen of the display unit of the client computer 1 as the result of searching the image database.

The ID and password of a user are transmitted from the client computer 1 to the server 10 and the client computer 1 logs onto the server 10 (step 81).

The server 10 refers to the user information that has been stored in the user-information storage unit 26 and checks to see whether the user of the accessing client computer 1 has access privilege (step 91). If the user does have access privilege, the user information corresponding to the user who has accessed the server 10 is read out (step 92) and stored temporarily in the RAM 12.

If the client computer 1 is to conduct a database search ("YES" at step 82), the search image is displayed on the display screen of the display unit 5 of the client computer 1 (step 83). The user enters search conditions in accordance with the search image (step 84). If a search execution area contained in the search image is clicked by the user ("YES" at step 85), data representing the entered search conditions (which data serves also as a style-sheet read-out command described below) is transmitted from the client computer 1 to the server 10.

The server 10 receives the data representing the search conditions. The server generates an SQL (Structured Query Language) statement from the received search conditions and executes processing for searching the database 22 (step 93). The server 10 reads the user information out of the user-information storage unit 26 and reads the style sheet selected by the user out of the style-sheet storage unit 28. Using the style sheet that has been read out, the server generates an HTML (HyperText Markup Language) file for expressing the search results (step 95). The generated HTML file is transmitted from the server 10 to the client computer 1.

When the HTML file is received by the client computer 1, images that are the results of the search represented by the received HTML files are displayed on the display screen of the display unit 5 (step 86). As a result, images obtained by the search are displayed in a layout of the kind shown in FIGS. 6 and 7 in accordance with the selection made by the user. Of course, data representing a style sheet and data representing the images found by the search may be transmitted separately from the server 10 to the client computer 1 and the client computer 1 may merge the images with the style sheet.

By way of example, if the users have user IDs "0" and "2", the selected style sheet will be the style sheet of type A. The style sheet shown in FIG. 6, therefore, will be displayed on the display screen of display unit 5. The style sheet of type A shown in FIG. 6 has three vertically arranged areas 101.

Each area 101 is formed to include an area 102 on its left side for displaying an image. Areas 103, 104, 105 and 106 for displaying image information are formed on the right side of the image display area 102. The area 103 displays the date of photography of the image being displayed in the image area 102, the area 104 displays the location where the image being displayed in the image area 102 was photographed, the area 105 displays the content of the image being displayed in the image area 102, and the area 106 displays remarks regarding the image being displayed in the image area 102. A comment area 107 is displayed at the bottom of the column of areas 101. Also included are an area 108 clicked by the user to go back to the preceding image and an area 109 clicked by the user to go to the next image.

If the user has a user ID "3", the selected style sheet will be the style sheet of type B. The style sheet shown in FIG. 7, therefore, will be displayed on the display screen of the display unit 5. The style sheet of type B shown in FIG. 7 has areas 120 arranged in three rows and three columns.

Each area 120 is formed to include an upper area 121 for displaying an image. Formed below the image display area 121 are areas 122, 123 and 124 for displaying image information. The area 122 displays the location where the image being displayed in the image area 121 was photographed, the area 123 displays the content of the image being displayed in the image area 121, and the area 124 displays the date of photography of the image being displayed in the image area 121.

When the result of a search is such that there are so many relevant images that they cannot be displayed in an image of a single frame, the user can go back to the preceding image or forward to the next image. To accomplish this, there are also included an area 126 clicked by the user to go back to the preceding image and an area 127 clicked by the user to go forward to the next image.

If the area 109 or 127 which allows the user of the client computer 1 to display the next image is clicked by the user, succeeding images satisfying the search conditions will be displayed in the layout of the selected style sheet ("YES" at step 87).

The processing of steps 83 to 87 is repeated until the database search ends (step 88).

Thus, it is so arranged that images resulting from a search can be displayed in a layout desired by the user. Since the user need not select the desired style sheet whenever the server 10 is accessed, the user is not inconvenienced.

Though the foregoing embodiment is such that image search processing is executed while the server 10 and client computer 1 are communicating data with each other, data communication is not necessarily required.

As many apparently widely different embodiments of the present invention can be made without departing from the spirit and scope thereof, it is to be understood that the invention is not limited to the specific embodiments thereof except as defined in the appended claims.

What is claimed is:

1. A style-sheet output apparatus comprising:
   a style-sheet designating unit for designating a desired style sheet from among a plurality of style sheets, wherein there have been stored a plurality of types of data representing style sheets stipulating layouts of images which include a plurality of items such as images and text;
   a storage unit for storing, in association with a user, data identifying a style sheet designated by said style-sheet designating unit;
   an identification-data input unit for inputting data which identifies a user;
   a read-out command input unit for inputting a style-sheet read-out command; and
   a style-sheet output unit for outputting, in accordance with a style-sheet read-out command that has been input from said read-out command input unit, and on the basis of a relationship that has been stored in said storage unit, data representing a style sheet corresponding to a user identified by identification data that has been input from said identification-data input unit.

2. The apparatus according to claim 1, wherein said storage unit stores a relationship between data identifying a prescribed style sheet and a user, and said apparatus further comprises a unit which, when a designation has been made by said style-sheet designating unit, is for rewriting the data identifying the prescribed style sheet stored in said storage unit to data identifying a style sheet that has been designated.

3. The apparatus according to claim 1, further comprising:
   a search-condition input unit for inputting a search condition;
   a search unit for searching an image database for data representing an image based upon a search condition that has been input from said search-condition input unit; and
   a unit for merging an image represented by image data found by the search conducted by said search unit with a style sheet represented by data that has been output from said style-sheet output unit.

4. A style-sheet output system comprising a server and a client computer that are capable of communicating data with each other;
   wherein a plurality of types of data representing style sheets stipulating layouts of images which include a plurality of items such as images and text have been stored, and said client computer designates a desired style sheet from among a plurality of these style sheets and transmits data identifying the designated style sheet to said server, said server storing the data identifying the designated style sheet in association with a user;
   said client computer including:
      an identification-data input unit for inputting user identification data which identifies a user;
      a read-out command input unit for inputting a style-sheet read-out command; and
      a transmitting unit for transmitting, to said server, user identification data that has been input by said identification-data input unit and a read-out command that has been input by said read-out command input unit; and
   said server includes:
      a receiving unit for receiving the user identification data and the read-out command that have been transmitted from said transmitting unit of the client computer; and a style-sheet output unit for outputting, in accordance with a style-sheet read-out command that has been received by said receiving unit, data representing a style sheet corresponding to a user identified by the user identification data.

5. A style-sheet output method comprising the steps of:

designating a desired style sheet from among a plurality of style sheets, wherein a plurality of types of data representing style sheets stipulating layouts of images which include a plurality of items such as images and text have been stored;

storing, in association with a user, data identifying a style sheet that has been designated;

inputting data for identifying a user as well as a style-sheet read-out command; and outputting data, which represents a style sheet corresponding to a user identified by identification data, in accordance with a style-sheet read-out command.

* * * * *